United States Patent
Lide et al.

(10) Patent No.: US 7,127,604 B2
(45) Date of Patent: Oct. 24, 2006

(54) CHANGING A CODEC OR MAC SIZE WITHOUT AFFECTING THE ENCRYPTION KEY IN PACKETCABLE COMMUNICATION

(75) Inventors: David Lide, Rockville, MD (US); Dunling Li, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 891 days.

(21) Appl. No.: 10/190,543

(22) Filed: Jul. 9, 2002

(65) Prior Publication Data
US 2004/0008844 A1 Jan. 15, 2004

(51) Int. Cl.
*H04L 9/00* (2006.01)

(52) U.S. Cl. .................. 713/100; 713/168; 714/2; 709/221

(58) Field of Classification Search ............ None
See application file for complete search history.

(56) References Cited

OTHER PUBLICATIONS

Peterson et al.; Computer Networks; 2000; Academic Press; 2nd Edition; Chapter 6.*

PacketCable Security Specification document PKT-SP-SEC-l01-991201; Dec. 1, 1999.*

* cited by examiner

*Primary Examiner*—Gilberto Barrón, Jr.
*Assistant Examiner*—Jung Kim
(74) *Attorney, Agent, or Firm*—Steven A. Shaw; W. James Brady; Frederick J. Telecky, Jr.

(57) ABSTRACT

A technique is described to change the codec or MAC (message authentication code) size in a packet security unit for PacketCable communications during realtime voice transmissions is described. An algorithm that provides fast RC4 key advancing to prevent MIPS (millions of instruction cycles per second) overflow is used to perform codec or MAC size changes. The invention is performed without changing the keying material, where the sender and receiver must continue the RC4 encryption process from its state prior to the codec or MAC size change. A sender needs to preserve continuity of the timestamp across a codec change, since the timestamp reflects realtime. Changing the codec or MAC size is likely to change the frame parameters. To preserve continuity of the RC4 state and the timestamp across the codec/MAC size change, the sender TX and receiver RX generates a new frame number. The new frame number is applied to the first frame generated by the new codec or MAC size.

10 Claims, 2 Drawing Sheets

CHANGING A CODEC OR MAC SIZE WITHOUT AFFECTING THE ENCRYPTION KEY IN PACKETCABLE COMMUNICATION

FIELD OF THE INVENTION

The present invention relates to changing the codec or MAC size during PacketCable voice transmissions without changing the keying material, where the sender and receiver must continue the RC4 encryption process from its state prior to the codec or MAC size change.

BACKGROUND OF THE INVENTION

PacketCable is a project conducted by Cable Television Laboratories and its member companies whose goal is to identify, qualify, and support packet-based voice and video products over cable systems. PacketCable is a set of protocols and associated element functional requirements developed to deliver Quality-of-Service enhanced secure communications services using packetized data transmission technology to a consumer's home over the cable television hybrid fiber-coaxial data network. The PacketCable Security Specification is hereby incorporated by reference; and interim PacketCable Security Specification document PKT-SP-SEC-I01-991201, released Dec. 1, 1999 is specifically referenced.

The RC4 (Rivest Cipher 4) algorithm is a stream cipher designed by Rivest for RSA Data Security and is a variable key-size stream cipher with byte-oriented operations. The algorithm is based on the use of a random permutation. It is commonly used to protect Internet traffic using the SSL (Secure Sockets Layer) protocol. RC4 is a variable-key-size cipher developed in 1987 by Ron Rivest for RSA Data Security, Inc. RC4 is used to encrypt media flows for voice and video over packet cable. The algorithm used variable length keys. For PacketCable the key length is set to 128 bits. RC4 is a pseudo-random number generator in output feedback mode. The key-stream is independent of the plaintext. The output stream is generated from the key and stored with the plaintext. There is no integrity protections on the data. RC4 uses a 256 entry substitution box which must be initialized. The entries are a permutation of the number 0 through 255, and the permutation is a function of the variable-length key.

Referring to FIG. 1, an example of a voice encryption system for using RC4 is illustrated. A packet security unit ("PSU") implements a single channel functionality for encryption/decryption and authentication of voice payload. A PSU is implemented as an independent module, but it is highly correlated to Packetized Voice Protocol Unit ("PVP") 10 and PVP uses PSU functions through a function pointer. PSU also supports Real Time Protocol ("RTP") with voice payload only. PSU can be configured to support authentication or encryption with or without authentication. RC4 algorithm is used in encryption, while authentication is based on Multi-linear Modula Hash Message Authentication Code ("MMH-MAC") algorithm. The MMH-Message Authentication Code ("MAC") is the message authentication code option for media flows. The MMH-MAC is computed over the RTP header and the payload generated by the codec 22.

A message authentication code ("MAC") provides security to each packet of a media stream. A MAC ensures the receiver that the packet came from the legitimate sender and that it has not been tampered with en route. A MAC defends against a variety of potential known attacks, such as replay and clogging. It also may defend against as-yet-undiscovered attacks. Typically, a MAC consists of eight or more octets appended to the message being protected. A two or four byte MAC can be chosen during configuration for PacketCable. The encryption keys and keys lengths are configurable, for example the RC4 key can require 128 bits. A MAC key and key length are configurable as well. The maximum MAC key length should be the maximum RTP packet length plus the number of MAC digits. An exemplary voice payload size is 240 bytes (30 ms*80 PCM samples/10 ms). The maximum RTP header length should be 12 bytes plus the maximum contributing source identifiers (CSRC) length of 64 bytes, or 72 bytes. The MAC key length should then be at least 316 bytes. The RC4 and MAC keys are initialized by loading key messages from MIC.

In FIG. 1, in the PVP transmit side (TX) 12, the PSU receives packets from the codec 22, encrypts one frame of voice payload, and performs the message authentication on one RTP packet. Packets are sent to and received from a network driver unit (NDU)20. At the PVP receive end (RX) 14, the PSU performs the message authentication on the receive packets first, then decrypts the voice payload. After the receiving packets through PSU RX 14, packets are sent to a voice playout unit (VPU) 16, after which they are sent back to the codec 22. According to the RC4 algorithm, RC4 states must be synchronized with an RTP packet timestamp and the RC4 state adjustments are involved in both PVP TX 12 and RX 14 directions. Because of network packet delay jittering and voice activity detection operations, PVP 10 may not receive any packets for a long period of time. The next received packet will require a large amount of RC4 states adjustments in that case. In order to avoid interrupting a conversation by adjusting the RC4 states during voice transmissions, RC4 decryption states are adjusted during a no packet arrival period. A 2.5 ms local clock is used in the RC4 decryption states advance function.

The RC4 algorithm has been specified for use in an RTP (Real Time Protocol) stream in PacketCable. The algorithm applies only to the RTP payload, not the header, and does not add any additional bytes to the voice packets. The algorithm assumes that voice payload packets are part of one large data stream. The state must be maintained over packet boundaries, however, and even over codec 22 changes. The timestamp field in the RTP header is used to keep the sender and receiver RC4 states synchronized. The state of the RC4 encryption process is preserved between frame encodings. The RC4 process operates as if the payload of each frame is padded up to length (Ne+Nm) octets, where Ne is the maximum size of the payload of an event packet (the value of Ne is at least as large as Nc which is the number of octets in one frame of compressed audio; Nc is a consent value that depends on the voice codec and on the audio frame size; the payload of a voice packet contains the Nc octets making up one frame of compressed audio), and Nm is the number of MAC octets; with a value of zero if the optional MAC is not selected, or two or four which represents the MAC size if the optional MAC is selected. The payloads of all packets are concatenated into a single stream. The stream is encrypted by a single RC4 encryption process.

RC4 encryption state Nk is the number of keystream octets that have been previously generated by the RC4 encryption process, whether used or discarded. Nk has value 0 immediately after the RC4 process is initialized with a new key and increments with each generated octet of keystream. Nk is used both in RC4 encryption and MAC process. For each frame, the RC4 encryption state Nk should be set to the value Nf(Ne+Nm), where Nf is the codec frame number, and Ne is the maximum size of the payload of an event packet; and Nm is the number of MAC octets. This value is 0, if the optional MAC is not selected, or 1 or 2 which represents the MAC size if the optional MAC is selected. The octets of the packet's payload are encrypted using the RC4 encryption process and inserted into the payload field. If there are B octets to be encrypted, then they are encrypted using octets Nk+Nm to Nk+Nm+B−1, inclusive and in order in the RC4 key-stream. The Nm octets from Nk to Nk+Nm−1 are used in MAC digit calculation. Not all of the key-stream octets generated by the RC4 process are necessarily used. The RC4 encryption process is advanced for silent codec frames that are not actually transmitted, since the value of Nf increments even for silent frames. Since the codec calls operates continuously at codec frame rate during conversation, TX RC4 encryption state synchronization involves updating Nk to Nf (Ne+Nm) according to the current frame number Nf The next expected frame number Nf_next (16 bits) is used to represent the RC4 state.

Prior to decrypting the packet's payload or verifying its Mac digits, RC4 decryption state at the receiver side, RX, must match the RC4 encryption state of sender side TX. The RC4 decryption state Nk should be set to the value Nf*(Ne+Nm) as well, where the maximum payload size Ne and the number of MAC octets Nm should be the same as the transmit side TX during the channel setup. The frame number Nf is computed from the value of timestamp field in the packet header. The timestamp field is a 32-bit value that reflects the sampling instant of the first uncompressed speech sample encoded in the packet. The timestamp field is used by the receiver to synchronize its decryption process to the encryption process of the sender. The starting times of two communicating parties are independent and their time difference is arbitrary. The starting time differences could be beyond the timestamp threshold in timestamp check. A MIPS based RC4 state adjustment algorithm is used for RC4 states adjustment in the first receive packet.

Therefore, the timestamp value is very crucial for RC4 decryption state synchronization, the receiver should perform a check on the timestamp value in the RTP header. A timestamp check state is used to check if the timestamp of the current packet is in a reasonable range of the value expected based on the receiver's local clock. The packet will be rejected if the time stamp is invalid. When no packets are sent during silence periods or during packet losses, the RC4 states are advanced using a local clock. RC4 state synchronization will advance RC4 state forwards or backwards in order to make RC4 states Nk equal to Nf_next (Ne+Nm). An authentication check is performed on a MAC key and one random pad from RC4. The states transitions are controlled by the system configuration parameters and received packet timestamps.

Although the PacketCable Security Specification provides guidance for security measures in its implementation, the standard will not operate correctly when a codec or MAC change occurs during a call transmission. The lack of a proper timestamp for transitioned packets prevents the receiver from synchronizing with the transmitter. Therefore, what is needed is a way to adjust the RC4 state to synchronize between the transmitter and the receiving when changing a codec or MAC during PacketCable communications.

BRIEF DESCRIPTION OF THE DRAWINGS

Preferred embodiments of the invention are discussed hereinafter in reference to the drawings, in which.

DETAILED DESCRIPTION OF THE INVENTION

There is described herein a technique that computes a new frame number to apply to the first frame generated by a new codec. This technique allows a PacketCable coder/decoder ("codec") or message authentication code ("MAC") to be changed in realtime without requiring new encryption key material.

Figure 1:
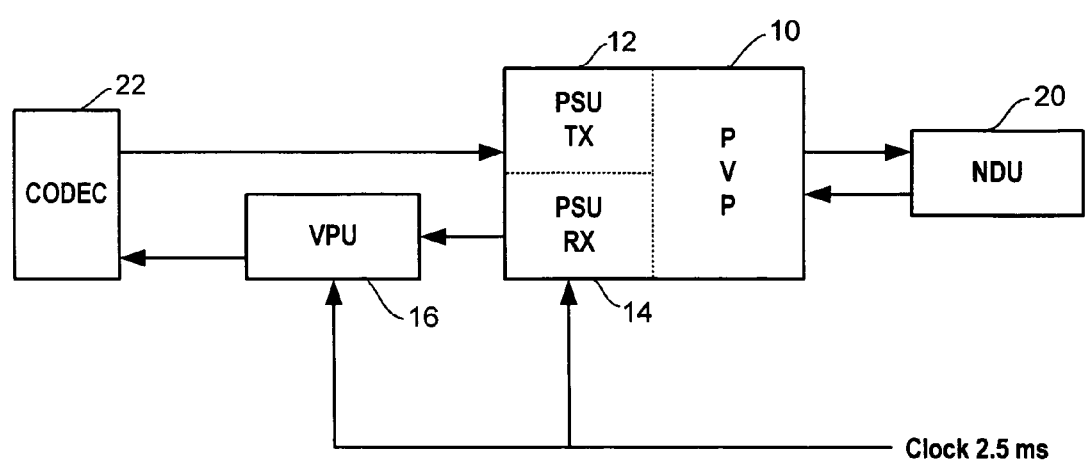
FIG. 1 is a prior art diagram of an packet security unit for PacketCable communications.
Figure 2:
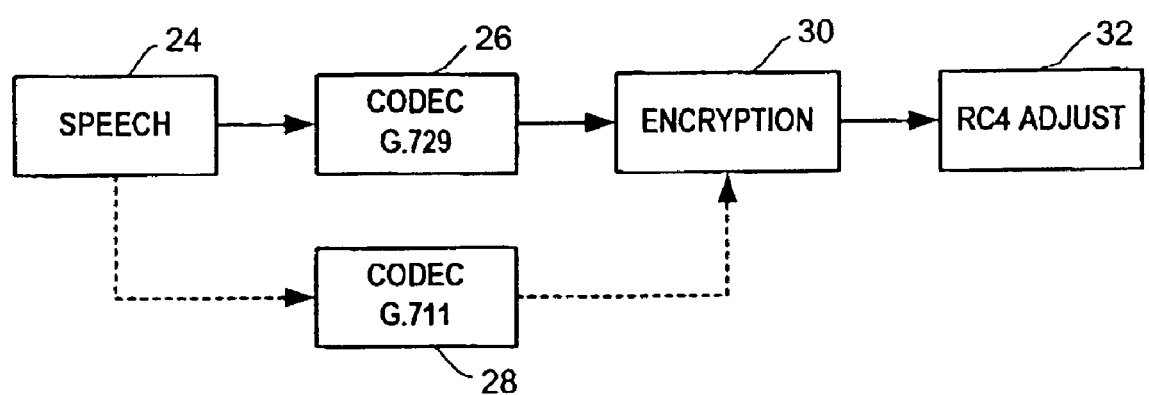
FIG. 2 is diagram of a switchover to a new codec in PacketCable communications.

Referring to FIG. 1, speech 24 from a sender is transmitted to a codec 26, such as G.729 that converts the speech into digital packets. The digital transmission is then encrypted and sent to a receiver. If the codec or MAC size is changed, such as a change to G.711 codec 28, during transmissions without changing the keying material, the sender and receiver must continue the RC4 encryption process from its state prior to the codec change. It cannot reset the state to zero, since a stream cipher such as RC4 may not reuse a keystream without exposing plaintext. The sender also needs to preserve continuity of the timestamp across the codec change, since the timestamp reflects realtime. Since the RC4 state is a function of the timestamp, it must be adjusted 32 to its timestamp corresponding position before any encryption or MAC performs. Due to the packet loss, the starting time difference of the communication parties, key changes, or codec/MAC switching, a large amount of RC4 states adjustments are not avoidable. The limitation of system MIPS will not allow a very large adjustment of the amount of RC4 states during the same instance. However, a MIPS-based RC4 state adjustment algorithm can accomplish the task. The algorithm adjusts the maximum possible number of RC4 states possible without exceeding maximum system MIPS during each instance in time. The current packets drop until RC4 reaches its required states. The number of packets dropped will show in the PVP statistics.

Changing the codec or MAC size is likely to change the frame parameters. Changing the codec is likely to change the number of octets carried in the payload of a voice packet, which changes the proportionality constant that relates the RC4 state to the timestamp. To preserve continuity of the RC4 state and the timestamp across the codec/MAC size change, the sender TX and receiver RX must compute a new frame number. The new frame number is applied to the first frame generated by the new codec or MAC size. The new frame number is calculated according to $$N_{f,new} = \text{roof}\left[\frac{(N_{f,old} + 1)(N_{e,old} + N_m)}{N_{e,new} + N_m}\right] \quad (1)$$

$$N_{f,new} = \text{roof}\left[\frac{(N_{f,old} + 1)(N_e + N_{m,old})}{N_e + N_{m,new}}\right] \quad (2)$$

where Ne and Nm reflect the maximum coding size for the new switched coded, e.g. Ne,old for G.729=10 bytes and Ne,new for G.711=80 bytes; and where equations (1) and (2) are corresponding to the codec change and MAC size change, respectively. Nf,new is the new frame number; Nf,old is the frame number used to encode the last packet under the old codec; Ne,old and Ne,new are the values of Ne under the old and new codecs, respectively; and roof(x) is the function that returns the smallest integer no less than x.

The amount by which RC4 states need to be advanced during codec/MAC size change should be Nf,new(Ne,new+Nm)−(Nf,old+1)(Ne,old+Nm) or
Nf,new(Ne+Nm,new)−(Nf,old+1)(Ne+Nm,old)

which is less than (Ne,new+Nm) or (Ne+Nm,new). However, the new frame number Nf,new is not equal to the real frame number Nf, where $$N_f = \frac{Timestamp - Intial\_Timestamp}{N_u}$$

Therefore, the new RC4 state is highly dependent on the codec/MAC size change timing, Nf,old. The sender and receiver can not synchronize the new RC4 states to each other unless TX and RX can switch over at the same time or Micro can provide exact switching over time, for example switch over with the same timestamp. Practically, the codec and MAC size switches for both TX and RX can not occur simultaneously. Occasionally on only the TX or RX end, only one side needs to be changed and the opposite end will remain in status quo. Since the new frame number Nf,new can not be calculated from the timestamp, the codec/MAC size change algorithm has TX and RX synchronization problems.

Other network related issues occur at the receiver side only. First of all, if the packets arrive out of order, the receiver should push the RC4 process backwards as well as forwards in order to match the state of the sender's RC4 process. Secondly, the packet delay may vary because of network delay jittering, causing the receiver to adjust its RC4 decryption state to avoid too much backward RC4 process. Third, the codec with VAD has discontinuous transmission behavior. The RC4 encryption process is advanced for silent codec frames that are not actually transmitted, since the value of Nf increments even for silent frames.

The receiver RX in the Packet Security Unit ("PSU") of FIG. 1 must advance its RC4 decryption state based on its local clocks during a silent period in order to catch up to its state for the next packet and limit the decryption peak MIPS consumption in a reasonable range. Therefore, RC4 decryption state Nk should be advanced if the duration of no packet arrival is beyond a threshold. It can be difficult to determine the threshold since the above problems are interactive to each other. If this threshold is high, RC4 decryption state will be advanced to its current right state and on, RC4 backward process must be performed. However, if the threshold is low, RC4 decryption state will be behind its state, the receiver must advance its RC4 decryption state before decrypting the current packet. Therefore, this threshold is very crucial to the overall MIPS (millions of instruction cycles per second) consumption. The ideal threshold should minimize the backward process and peak MIPS. Theoretically, the threshold should be adaptive to the current network traffic condition and the duration of no packet arrival. The average packet delay is a very good feature to represent current network traffic conditions, and the current system MIPS consumption will affect the average packet delay. To conserve MIPS during the decryption state synchronization, received packets will be dropped if packet arrival delay is beyond a threshold, which is the maximum jitter size, and if packets arrive out of order.

As stated previously, although the PacketCable Security Specification provides guidance for security measures in its implementation, the standard will not operate correctly when a codec or MAC change occurs during a call transmission. The lack of a proper timestamp for transitioned packets prevents the receiver from synchronizing with the transmitter. The following is an example of the problem with a MAC size change from two to zero, which shows the TX and RX out of synch after the change. The system is configured as one frame per packet; the frame size is 10 ms, for Nu=80; G.729 codec Ne=10; and MAC size Nm=2. The initial timestamp is assumed zero and Nm,new=0.

If MAC size changes occurred at the third packet in the TX direction then Nf,old=2 and timestamp=240. Current RC4 states Nk,old=(Nf,old+1)*(Ne+Nm,old)=3*(10+2)=36. According to equation (2), Nf,new=roof[(2+1)*(10+2)/(10+0)]=roof[3.6]=4. The new RC4 states Nk,new=Nf,new*(Ne+Nm,new)=4*(10+0)=40. So, TX needs to advance (40−36)=4 RC4 states forward during the MAC size change. After the MAC size is changed, the new RC4 states can be calculated as follows:

$$N_k = N_{k,new} + \frac{Timestamp - 240}{N_u} * (N_e + N_{m,new})$$

If timestamp=16*80=1280, then its new RC4 states Nk=40+(280−240)/80*(10+0)=40+13*10=170 in the TX direction.

If MAC size change occurred at the 15th packet in the RX direction, the Nf,old=14 and timestamp=15*80=1200. The current RC4 states Nk,old=(Nf,old+1)(Ne+Nm,old)=15*(10+2)=180. Based on Equation (2), Nf,new=roof[(14+1)*(10+2)/(10+0)]=18. The new RC4 states Nk,new=Nf,new*(Ne+Nm,new)=18*(10+0)=180. RX does not need to adjust RC4 states for the MAC size change. If the timestamp=1280, then RX corresponding new RC4 states Nk=180+(1280−1200)/80*(10+0)=190. Thus, based on the codec/MAC size change algorithm, the TX RC4 state (Nk=170) is different from the RX RC4 state (Nk=190) for the same packet (timestamp=1280). In the case which only one side needs to perform a codec/MAC size change, TX and RX are totally out of synch.

To solve this problem, the following timestamp-based algorithm can be applied in codec/MAC size changes. The basis of the solution of the present invention is that the frame number is always equal to the real frame number, which can be calculated from the current timestamp. The new RC4 states can be calculated by equations (3) for codec and (4) for MAC size changes. Equation (5) can be used to calculation new RC4 states for both codec and MAC size changes.

$Nk$, new=Timestamp−Intial_Timestamp/$Nu$($Ne$, new+$Nm$)     (3)

$Nk$, new=(Timestamp−Intial_Timestamp)/$Nu$($Ne$+$Nm$, new)     (4)

$Nk$, new=(Timestamp−Intial_Timestamp)/$Nu$($Ne$, new+$Nm$, new)     (5)

The number of RC4 states to be adjusted is equal to Nk,new−Nk,old. Equations (6) and (7) are the number of RC4 states to be adjusted during codec and MAC size changes, respectively. Equations (5) and (8) are generalized cases which can handle switching codec and MAC size at the same time.

$$\Delta N_k = \frac{(Timestamp - Intial\_Timestamp)}{N_u}(N_{e,new} - N_{e,old}) \quad (6)$$

$$\Delta N_k = \frac{(Timestamp - Intial\_Timestamp)}{N_u}(N_{m,new} - N_{m,old}) \quad (7)$$

$$\Delta N_k = \frac{(Timestamp - Intial\_Timestamp)}{N_u}(N_{e,new} + N_{m,new} - N_{e,old} - N_{m,old}) \quad (8)$$

If $\Delta Nk$ is positive, RC4 states need to be advanced forward; and if $\Delta Nk$ is negative, RC4 states need to be advanced backwards. $\Delta Nk$ could be a large number if the switching over time is far from the beginning of the call. Therefore, this algorithm could suffer a large RC4 state adjustment during the codec/MAC size change.

Table 1 shows the dynamic range of |$\Delta Nk$| for different codec and MAC sizes and switch timings. In some situations, |$\Delta Nk$| could be very large such that a processor does not have adequate MIPS to adjust $\Delta Nk$ RC4 states in one frame. In such situations, the packet drop method is used to break down |$\Delta Nk$| into pieces based on the maximum available MIPS of the system. The communication will temporarily stop during the codec/MAC size change if the change occurs at an elapsed time far enough from the beginning of the call. Npacket is the number of dropped packets during codec/MAC size change while the maximum available MIPS for RC4 adjustment is 2.5 MIPS. Table 1 shows how the MAC size change will not affect communication if the switchover occurs within 10 minutes from the beginning of the call. For codec change, the worst case is the switchover between G.723 and PCM, which is very close to the case between G.729 and PCM. If the codec switch occurs in five minutes from the beginning of the call, both sides will not notice the packet drop effects. However, if this occurs at ten minutes, the system will lose 420 ms of voice. If the switch occurs at 30 minutes, the system will lose 1.3 seconds of voice, and if the switch occurs at one or two hours, the system will lose 2.52 or 5.04 seconds of voice, respectively.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. A method for changing the codec without changing the encryption key in PacketCable communications, comprising:

computing a new frame number by the sender;
   computing a new frame number by the receiver,
   wherein the new frame number is determined by finding the real frame number, which is calculated using a timestamp-based algorithm using a timestamp simultaneous to the real frame number, the calculation for the new frame number being performed according to $$N_{f,new} = \text{roof}\left[\frac{(N_{f,old} + 1)(N_{e,old} + N_m)}{N_{e,new} + N_m}\right]$$

applying the new frame number to the first frame generated by the new codec; and
   calculating a new RC4 state after changing the codec.

2. The method of claim 1,
   wherein the finding a new RC4 state after changing the codec is calculated using the formula $$N_{k,new} = \frac{Timestamp - Intial\_Timestamp}{N_u}(N_{e,new} + N_m).$$

3. The method of claim 1, wherein the finding a new RC4 state after changing the codec is calculated using the formula $$N_{k,new} = \frac{(Timestamp - Intial\_Timestamp)}{N_u}(N_{e,new} + N_{m,new}).$$

4. The method of claim 1, further comprising:
   finding the number of RC4 states to be adjusted during codec changes using a timestamp-based algorithm.

TABLE 1

Adjusted RC4 States and Number of Dropped Packets*

| First Codec Duration | G.729 (Ne = 10) <> PCM (Ne = 80) | | MAC size (0 <> 2 or 2 <> 4) | | MAC size (Nm = 0 <> Nm = 4) | |
|---|---|---|---|---|---|---|
| Time | \|ΔNk\| | Npacket | \|ΔNk\| | Npacket | \|ΔNk\| | Npacket |
| 10 ms | 70 | 0 | 2 | 0 | 4 | 0 |
| 1 sec | 7000 | 0 | 200 | 0 | 400 | 0 |
| 1 min | 420,000 | 5 | 12,000 | 0 | 24,000 | 0 |
| 2 min | 840,000 | 9 | 24,000 | 0 | 48,000 | 0 |
| 5 min | 2,100,000 | 21 | 60,000 | 0 | 120,000 | 2 |
| 10 min | 4,200,000 | 42 | 120,000 | 2 | 240,000 | 3 |
| 30 min | 12,600,000 | 130 | 360,000 | 4 | 720,000 | 8 |
| 1 hour | 25,200,000 | 252 | 720,000 | 8 | 1,440,000 | 15 |
| 2 hours | 50,400,000 | 504 | 1,440,000 | 15 | 2,880,000 | 29 |

*1 frame/packet, frame length = 10 ms

5. The method of claim 4, further comprising:
dropping packets during a codec change when required processing resources are greater than a maximum threshold.

6. A method for changing a message authentication code (MAC) without changing the encryption key in PacketCable communications, comprising:
computing a new frame number by the sender;
computing a new frame number by the receiver,
wherein the new frame number is determined by finding the real frame number, which is calculated using a timestamp-based algorithm using a timestamp simultaneous to the real frame number, the calculation for the new frame number being performed according to $$N_{f,new} = \text{roof}\left[\frac{(N_{f,old}+1)(N_e+N_{m,old})}{N_e+N_{m,new}}\right]$$

applying the new frame number to the first frame generated by the new MAC size; and
calculating a new RC4 state after changing the MAC size.

7. The method of claim 6, wherein the finding a new RC4 state after changing the MAC size is calculated using the formula $$N_{k,new} = \frac{(Timestamp - Intial\_Timestamp)}{N_u}(N_{e,new}+N_{m,new}).$$

8. The method of claim 6, further comprising:
finding the number of RC4 states to be adjusted during MAC size changes using a timestamp-based algorithm.

9. The method of claim 8, further comprising:
dropping packets during MAC size change when required processing resources are greater than a maximum threshold.

10. The method of claim 6,
wherein the finding a new RC4 state after changing the MAC size using the formula $$N_{k,new} = \frac{(Timestamp - Intial\_Timestamp)}{N_u}(N_e+N_{m,new}).$$

* * * * *